United States Patent
Sampath et al.

(10) Patent No.: US 6,266,774 B1
(45) Date of Patent: Jul. 24, 2001

(54) METHOD AND SYSTEM FOR SECURING, MANAGING OR OPTIMIZING A PERSONAL COMPUTER

(75) Inventors: Srivats Sampath, San Jose; Chandrasekar Balasubramaniam; Ravi Lingarkar, both of Sunnyvale; Babu Katchapalayam, Santa Clara; Ravi Kannan, Los Angeles, all of CA (US)

(73) Assignee: McAfee.com Corporation, Santa Clara, CA (US)

( * ) Notice: Subject to any disclaimer, the term of this patent is extended or adjusted under 35 U.S.C. 154(b) by 0 days.

(21) Appl. No.: 09/208,735

(22) Filed: Dec. 8, 1998

(51) Int. Cl.[7] ..................................................... G06F 15/16
(52) U.S. Cl. ............................................ 713/201; 709/219
(58) Field of Search ................................... 713/1, 2, 100, 713/201, 202; 709/203, 219

(56) References Cited

U.S. PATENT DOCUMENTS

| | | | |
|---|---|---|---|
| 5,928,323 | * 7/1999 | Gosling et al. | 709/203 |
| 5,950,008 | * 9/1999 | van Hoff | 395/707 |
| 5,960,170 | 9/1999 | Chen et al. | 395/183.14 |

OTHER PUBLICATIONS www.mcafee.com, Home—The Place for Your PC, one page, Aug. 9, 1999.
www.mcafee.com, Clinic—McAfee Clinic, one page, Aug. 9, 1999.
www.mcafee.com, Clinic—Coming Soon, one page, Aug. 9, 1999.
www.mcafee.com, Clinic—Optimize Performance, one page, Aug. 9, 1999.
www.mcafee.com, Clinic—Clean Hard Drive, one page, Aug. 9, 1999.
www.mcafee.com, Clinic—Software Update Finder, one page, Aug. 9, 1999.
www.mcafee.com, Clinic—Fees for Mcafee Clinic Premium Services, two pages, Aug. 9, 1999.
msdn.microsoft.com, COM Techniques by Panther Software, Introduction, two pages, Oct. 7, 1998.
msdn.microsoft.com, The ABCs of MFC ActiveX Controls, 31 pages, Oct. 22, 1996.
msdn.microsoft.com, Web Workshop—Signing and Marking ActiveX Controls, 9 pages, Oct. 15, 1996.
msdn.microsoft.com, Web Workshop—ActiveX Controls Overview, two pages, Oct. 23, 1998.
www.microsoft.com, About Microsoft COM, two pages, Feb. 25, 1999.

(List continued on next page.)

*Primary Examiner*—Thomas M. Heckler
(74) *Attorney, Agent, or Firm*—Pennie & Edmonds LLP

(57) ABSTRACT

A system, method, and computer program product for delivery and automatic execution of security, management, or optimization software over an Internet connection to a user computer responsive to a user request entered via a web browser on the user computer. In a preferred embodiment, the user directs the Internet browser to a Internet clinical services provider web site computer and logs in to the site using an identifier and a secure password and optionally makes a selection of the type of servicing desired, wherein an automatically-executing software package encapsulated within a markup language communication unit deliverable across the Internet is delivered, to the user computer, the automatically-executing software package being adapted to perform security, management, or optimization functions on the user computer. User identifiers and passwords enabling the downloads may be provided on a per-download basis or on a subscription basis.

14 Claims, 5 Drawing Sheets

OTHER PUBLICATIONS www.microsoft.com, Component Object Model (COM), two pages, Mar. 30, 1999.

msdn.microsoft.com, The Component Object Model: A Technical Overview, 19 pages, 10/94.

msdn.microsoft.com, The COM Programmer's Cookbook, 67 pages, Sep. 13, 1995.

msdn.microsoft.com, Events vs. Callbacks, two pages, 4/97.

msdn.microsoft.com, Developing Applications with OLE 2.0, 20 pages, Sep. 13, 1994.

msdn.microsoft.com, What OLE is Really About, 45 pages, 7/96.

msdn.microsoft.com, OLE for Idiots: A is for Attitude, 7 pages, Jun. 22, 1993.

msdn.microsoft.com, OLE for Idiots: B is for Beginning, 8 pages, Jun. 22, 1993.

msdn.microsoft.com, OLE for Idiots: C is for Container, 33 pages, Aug. 6, 1993.

msdn.microsoft.com, OLE for Idiots: D is for Dragon, 12 pages, Sep. 20, 1993.

msdn.microsoft.com, OLE Property Sets Exposed, 26 pages, Oct. 6, 1995.

msdn.microsoft.com, OLE Integration Technologies: A Technical Overview, 20 pages, 10/94.

msdn.microsoft.com, Notes on Implementing an OLE Control Container, 66 pages, Sep. 21, 1994.

* cited by examiner

METHOD AND SYSTEM FOR SECURING, MANAGING OR OPTIMIZING A PERSONAL COMPUTER

FIELD OF THE INVENTION

This invention relates to the field of computer networks and Internet-related software applications. In particular, the invention is related to the art of scanning, providing security to, managing, and optimizing the software in a personal computer via the Internet without human intervention.

BACKGROUND OF THE INVENTION

This relates to a variety of problems such as computer viruses, cleanup of unusable or unwanted programs, and upgrading software that annoy and inconvenience the users of personal computers.

Despite the existence of good programs to detect and remove computer viruses, unscrupulous and adventurous computer programmers frequently try to skirt the virus antidote programs by creating new viruses that are hard to detect or remove. Thus, there is an on-going struggle between the creators of virus programs and the companies that find the antidotes for such viruses. A diligent user of a computer, therefore, must keep abreast of the developments in the computer virus warfare and upgrade to the latest software to detect and eliminate any new virus that may have infected his computer system. An automatic way of upgrading the virus antidote programs would help to ease the burden on the computer user.

Today, there are hundreds of vendors who offer trial versions ("demonstration copies") of software as a method of gaining inroads in the market place. A typical computer user may wish to evaluate demonstration copies of software programs by different vendors before making a decision to purchase the best program for a particular use. These demonstration copies, once downloaded and activated, will reside on the computer after any expiration date set therein unless deliberate efforts are made to remove them. Once a demonstration copy has expired, it will not be useful to a computer user and will only take up valuable storage space on the user's computer. A typical computer user must plod through all directories in the computer to identify the unusable or unwanted computer programs and remove them in a careful manner. To perform such task manually is not an optimal use of the time of a typical user. Additionally, in a manual cleanup of unusable or unwanted computer programs, there is a danger of deleting critical or useful programs accidentally, thus rendering the computer inoperative. Thus, there has developed a need for an accounting of software that is functional and useful and that which is unusable and merely occupying storage space on the computer.

To overcome some difficulties in removing outdated software programs from a user's computers, some vendors have started to market software programs like TuneUp™ to perform these tasks automatically. However, because of changes in the releases of operating systems, or the addition of new features, newer versions of such programs are released often. This creates a situation where a user must purchase and upgrade the previous versions of the "tuneup" programs. Accordingly, there is a need for an automatic method and system to cleanup a computer storage without the need to purchase newer versions of cleanup software. It is beneficial to a user if such cleanup happens without the user's intervention, and during the times when the user does not attend to the computer.

Another problem faced by a computer user is prompt notification that a new upgraded version of software is available. In the past, vendors have developed different ways to notify their customers. One method is to place a new advertisement banner indicating a new product or offering on other web sites and lead users to the advertiser's web site. But not many customers respond to such Internet invitations to click on an advertisement banner. Another way is to post a "What's New" page on a vendor's web site with links to other pages containing detailed information. This does not work well because this requires users to visit the vendor's web site periodically looking for new information. A third way is to maintain lists of electronic mail addresses for interested customers and send them e-mail notification periodically. Maintenance of these lists has proved to be tedious. Additionally, many customers object to receiving unsolicited electronic missives.

In order to automatically update information in a personal computer via the Internet, a new technology, called the "push" technology, has emerged. This technology incorporates the broadcasting model into web servers and browsers. The primary purpose of this technology is to overcome the problem of ensuring that interested parties are notified whenever information content in a web site is updated. "Content" is distinguished from other kinds of electronic information, such as programs and electronic mail messages in that content is the subject matter contained in a newspaper, a Lexis/Nexis™ database or the like. Content is neither a machine to perform a task nor a structure or description of how data are arranged in a computer. The push technology has helped corporations tailor their sites for particular groups of users so that interesting content is easily located. The push technology also has enabled messages to be sent to the audiences when it was deemed ready for publication. Using push publishing, web site publishers have delivered newsletters to niche audiences or notified subsets of their readers of updated content.

PointCast™ was one of the earliest implementations of the push technology to deliver information content. A user is typically advised to specify the type of content—news, entertainment, sports, or interest group related information—to be downloaded as it is updated. When upgraded content is available, the user may elect to download the information which can be browsed locally at the user's computer. PointCast™, however, is configured only to deliver content to the browser of a computer over the Internet. It is not designed or equipped with the means to download executable programs to a storage device connected to a computer and execute them at the remote computer.

Other products are aimed at delivering executable computer programs to a user computer and executing them locally. Oil Change™ is such a product. Once installed on the user computer, it allows automatic updating of computer programs via the Internet. In the case of Oil Change™, a user can update to new versions of previously purchased and loaded software, or download a new "patch" or a bugfix, device drivers for new peripheral devices, templates, clip art and business forms to work in conjunction with word processing software packages, screen saver images, or the latest amendments to the tax code to work with accounting software packages. Another example of a similar commercially available product is Castane™ from Marimba, Inc. In these systems, a user is required to download executable software programs from the vendor's web site via the Internet using a variant of a protocol called the File Transfer Protocol ("ftp"), and manually execute the downloaded programs on the user's personal computer thereafter. This mechanism is similar to loading software from a store-bought portable storage medium, such as a magnetic tape, a floppy disk or a CD ROM and running the software locally on a user's computer, except that the program is downloaded from the Internet instead of being loaded from a storage device.

Executing software on a 32-bit personal computer running a Windows-95®/98® or NT® operating system involves registering the software in a data store called Windows Registry. Windows Registry is a configuration data store for both hardware and software. The settings in Windows Registry control the behavior of the software. When a user attempts to execute software on a personal computer equipped with the above-mentioned operating systems, the operating system interprets the user's attempt and runs the software based exclusively on the information from the Windows Registry. Typically, an entry in Windows® Registry is made during the installation process of new software on a computer. Vendors of software application programs provide automatic means to ensure proper installation of their programs. If, on the other hand, no entry is made in the Windows® Registry, the context under which a user used the software is lost. There is a need, therefore, for a system and method to store the information related to the context of software usage without using the Windows® Registry as a repository of such information.

The programming language Java™ contemplates a virtual machine called the Java Virtual Machine™ (JVM) to run compiled Java™ code and stand-alone programs called "applets," after they are downloaded to a compatible web browser such as the Netscape® Navigator™, in a tightly controlled and secure environment. The JVM™ is a software implementation of a central processing unit (CPU), an essential component in every computer. Software written in this virtual machine methodology run within a contained environment defined to work only in a browser program and cannot access a client computer's file system or desktop easily.

Other programming methodologies, such as the Component Object Model (COM) have been developed to overcome this deficiency. However, this does not solve all the problems with delivering executable software to a client computer over the Internet in a form ready to be automatically executed. There is a need, therefore, for a method to encapsulate software as to make it executable automatically upon delivery to the client computer.

Users of personal computers do not wish to entrust access to their computers to an unknown remotely located entity, for fear of losing privacy or causing damage to data stored in their computers. A service offered by a trustworthy source such as McAfee Associates, Inc., a well known vendor of computer security software, will overcome the user reluctance to allowing access of their personal computers to a remote operator.

In summary, the state of the art provides means to deliver components of programs, means to deliver executable programs that must be executed locally by manual intervention, and means to provide content rather than executable programs. This art can be improved by delivering executable software rather than mere components to a personal computer; by allowing a trusted remote operator to access the internal components of a personal computer; and by executing programs automatically from a remote location. There is a need, for example, for a system and method in which when a user connects with a web site, an application may be downloaded, installed, registered and executed without any further intervention on the part of the user.

SUMMARY OF THE INVENTION

The foregoing problems are overcome in an illustrative embodiment of the invention in a network computing environment in which a server computer is programmed to download an application to a user computer across a network and and to execute the application on the user computer.

In one aspect of the present invention, the server computer receives a request in the form of a data packet from the user computer, whereupon the server computer causes a first web page image to be displayed on the user computer via a browser program running on the user computer. If the user inputs identification and a secure password in the first web page and transmits the first web page to the server computer, the server computer authenticates the user information and opens a secure connection with the user computer. The server computer thereupon, with no additional input from the user, searches the user computer for pre-designated executable software, and if such software is not found or is found to be outdated, downloads to the user computer said software or upgrades to such software. Finally, the server computer causes the software to be executed on the user computer.

In another aspect of the invention, the server computer stores user information received during an initial registration process and verifies the user information when a user requests the services of the server computer via the first web page.

In another aspect of the present invention, the server computer is programmed to generate periodic reports of user activity, and coupled with information stored in a billing database connected to the server computer, generates invoices to be sent to the user via email, fax or some other means. In a yet another aspect of the invention, the server computer is programmed to generate statistical summary reports of usage patterns for all users on a periodic or on-demand basis, said summary reports generated in textual form, graphical form or electronic form to be displayed on or transmitted to another computer.

DESCRIPTION OF THE DRAWINGS

These and other objects, features and advantages of the invention will be more readily apparent from the following detailed descriptions of a preferred embodiment in which:

FIGS. 4-1 and 4-2 are a flow chart depicting operation of an embodiment of the present invention.

DETAILED DESCRIPTION OF THE PREFERRED EMBODIMENTS

Figure 1:
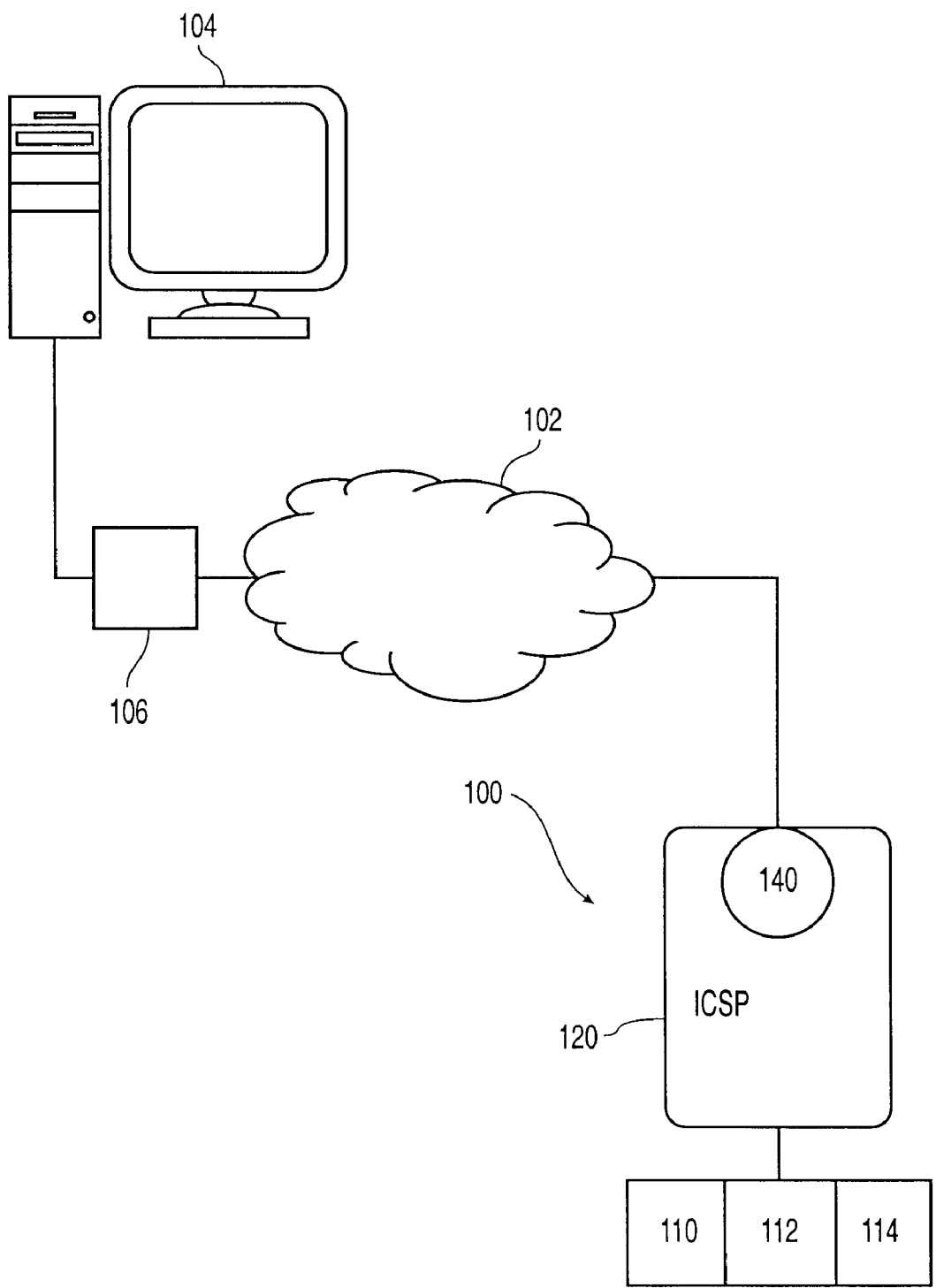
FIG. 1 depicts the overall architecture of an embodiment of the present invention comprising a server computer and a user computer connected via a data network.

Referring to the drawings, wherein like reference numbers refer to like parts, FIG. 1 illustrates one embodiment of the invention. An Internet clinical services provider ("ICSP") maintains and controls a server computer 100, which is connected to a data communication network, such as a Local Area Network, a Wide Area Network or other similar network. In a preferred embodiment as shown in FIG. 1, the data communication network is the Internet 102. The server computer 100 is equipped with storage 110, memory 112, and a network interface device 114 to connect to the Internet 102. The server computer 100 makes available information that can be accessed via Internet 102 by user computer 104 using a browser. User computer 104 is connected to the Internet 102 via a modem 106. The user computer 104 is equipped with a semiconductor memory, a storage device such as a disk drive, a central processing unit such as a Pentium™, Pentium II™, or Motorola 68000 microprocessor, and a display device such as a CRT. Additionally, the user computer 104 is equipped with software that enables the user to connect to the Internet 102 via the modem 106 as well as a browser 116 (shown in FIG. 2) that allows the user to "surf" the Internet 102.

Figure 2:
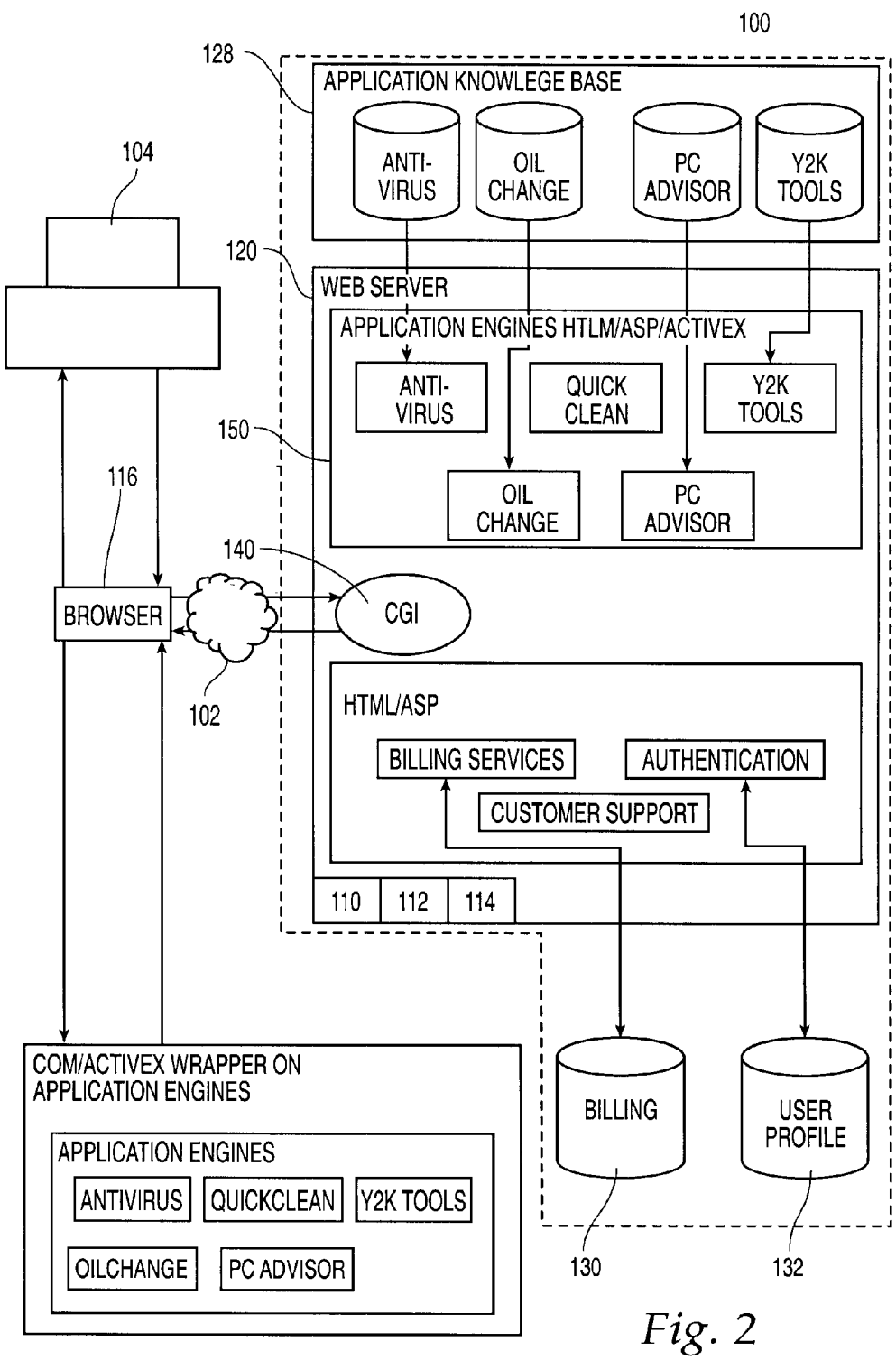
FIG. 2 is a detailed view of the component parts of an embodiment of the present invention.

Now referring to FIG. 2, in a preferred embodiment the server computer 100 comprises web server software 120, and is coupled to server-side engines 150 to deliver Hyper Text Markup Language (HTML), Microsof® Active Server PagesT™ (ASP), and ActiveX™.

Also on the server computer 100, a Common Gateway Interface (CGI) program 140 provides the software interconnection between the Internet 102 and other programs running on the server computer 100. Typically, the CGI program 140 forms the gateway to the Internet 102 by opening a connection via a Transport Control Protocol/Internet Protocol (TCP/IP) stack. All requests enter the server computer 100 via the CGI program 140, and all responses are delivered to the user computer 104 via the Internet 102 by way of the CGI program 140.

In a preferred embodiment, the server-side engine 150 software is implemented in the programming language ActiveX™ marketed by the Microsoft Corporation, of Redmond, Wash. ActiveX™ is a set of technologies that enables software components to interact with one another in a networked environment, regardless of the language in which they were created. ActiveX™ is built on the Component Object Model (COM). An ActiveX™ control is an object created using the ActiveX™ technology.

The server-side engines 150 are information delivery systems that respond to an Internet request for a particular type of service. A user makes an Internet request for service typically by typing a Universal Resource Locator (URL) in the web browser 116 running on the user computer 104, and submitting it in the form of a packet of data to the server computer 100. Thus, the user computer establishes a logical connection with the server computer. When the user computer 104 requests an ActiveX™ service, the server-side ActiveX™ engine 150 delivers corresponding objects called "ActiveX™ controls" and accompanying script files, embedded in a HTML file, to the user computer 104. ActiveX™ controls are programming building blocks that enable small component parts of software to be embedded in a HTML page 500 and sent to the client computer 104 in response to a user request. A more detailed explanation of the workings of the ActiveX™ controls and the method by which they are delivered to a user computer is provided in the book, "Understanding ActiveX™ and OLE™," by David Chappell, Microsoft® Press, Washington, 1996, which is incorporated herein by reference. One of ordinary skill in the art will recognize that ActiveX™ controls could easily be substituted with other similar mechanisms without undue experimentation if a Java™-enabled browser or any other browser provides a mechanism to access the inner workings of the user computer 104.

Also connected to the server computer 100 is an application knowledge base 128, which is a repository of data pertaining to the various software that are delivered to the client computer 104 by the server-side engines 150. The data stored by the application knowledge base 128 typically relates to the specific characteristics of an executable software program. For example, if a new version of an anti-virus program is available, then the knowledge base stores the changed programs or dynamic link libraries (DLL) of the new version. Before the server-side engines 150 download software to the user computer 104, they consult with the knowledge base and determine that an upgrade is needed for the user computer 104.

The server computer 100 is additionally connected to a billing database 130 and a user profile database 132. The billing database 130 stores the information related to any user requests for services offered by the ICSP; the user profile database 132 enables storage, update, and retrieval of any user-related information, such as name, contact address, telephone number and e-mail address. In a preferred embodiment, both the billing database 130 and the user profile database 132 are implemented using a Microsoft® SQL Serve™ database system. In alternative embodiments, any indexing system, relational database management system, flat files or other data storage and retrieval mechanism can be used. The billing database 130 and the user profile database 132 provide interfaces that enable a server-side engine to request pertinent information in the form of a database query-response interaction method, such as the Structured Query Language (SQL) method.

It is to be appreciated that, in accordance with a preferred embodiment, an account for the user may be created on the server computer before or during the registration step. Generally speaking, this will include the steps of taking a customer credit card number or receiving other funds from the customer, and adding funds to the account. Each time the user uses the services of the ICSP, the account may be debited. Alternatively, the account need not be debited every time the user uses the services of the ICSP, but rather the ICSP services may be offered on a subscription basis, wherein the customer may purchases a subscription at the beginning of a time period (such as one year) and may then use the services of the ICSP as much as desired through the course of the time period.

Figure 3:
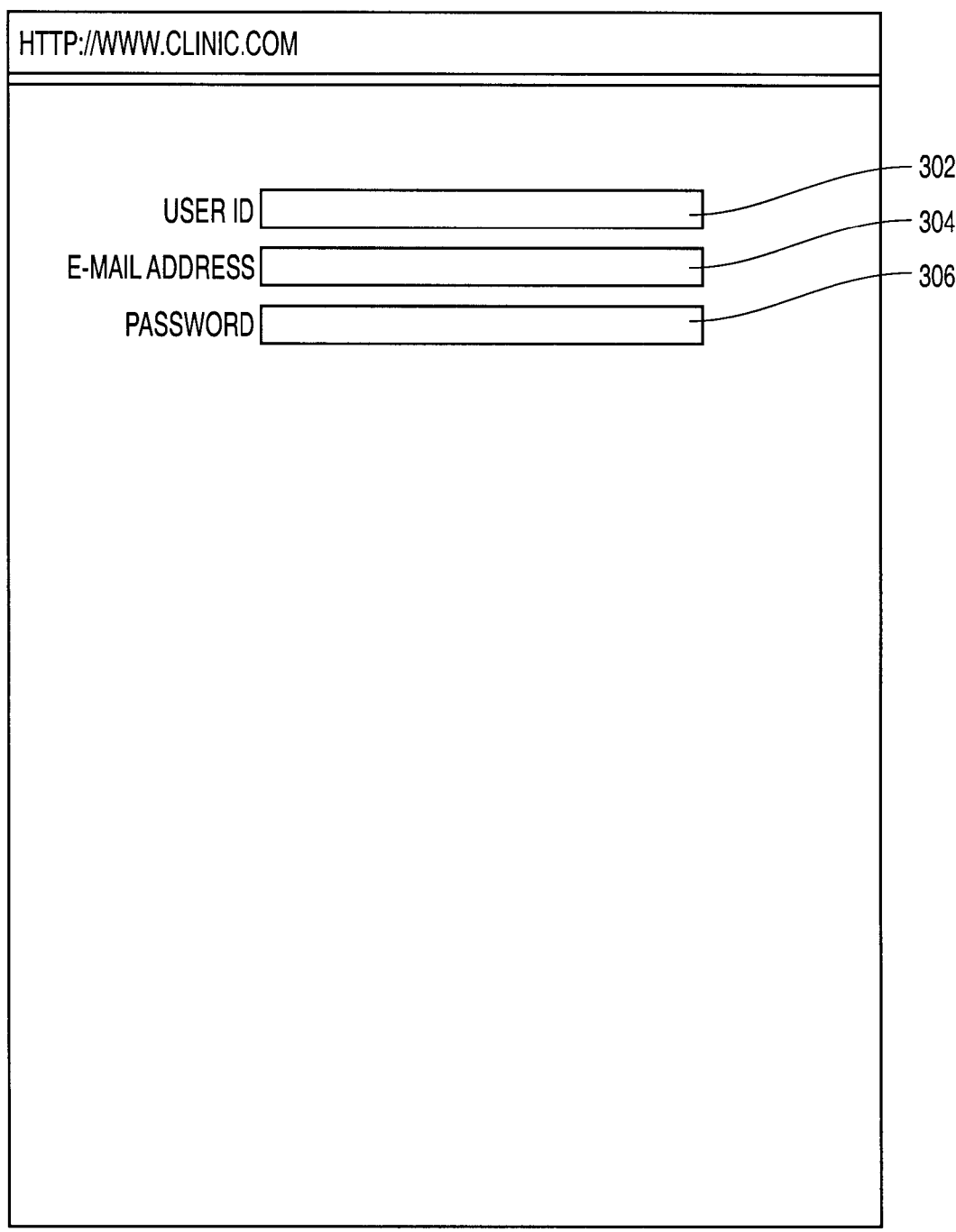
FIG. 3 is a sample web page depicting a user enrollment form.
Figures 1, 4:
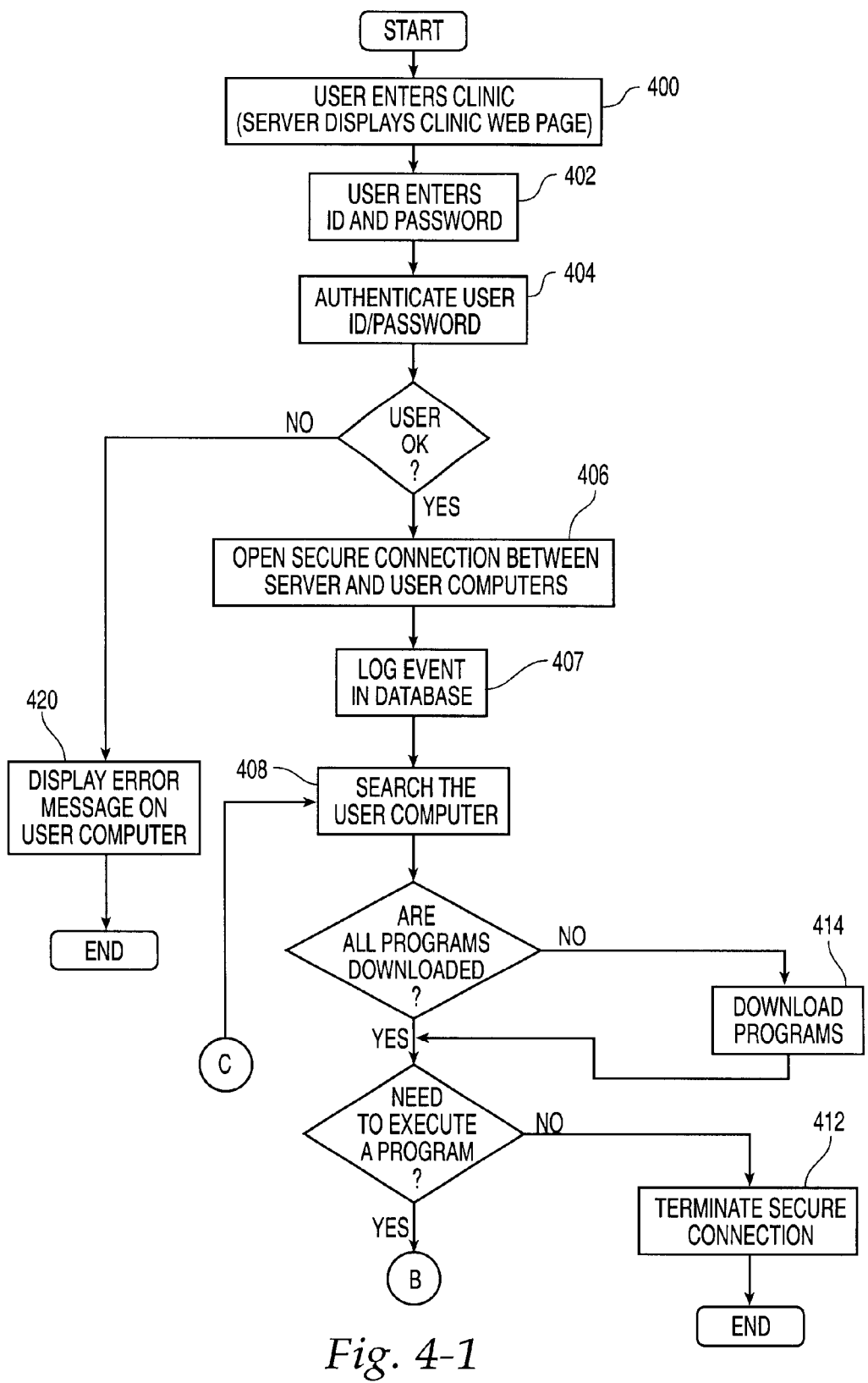
Figures 2, 4:
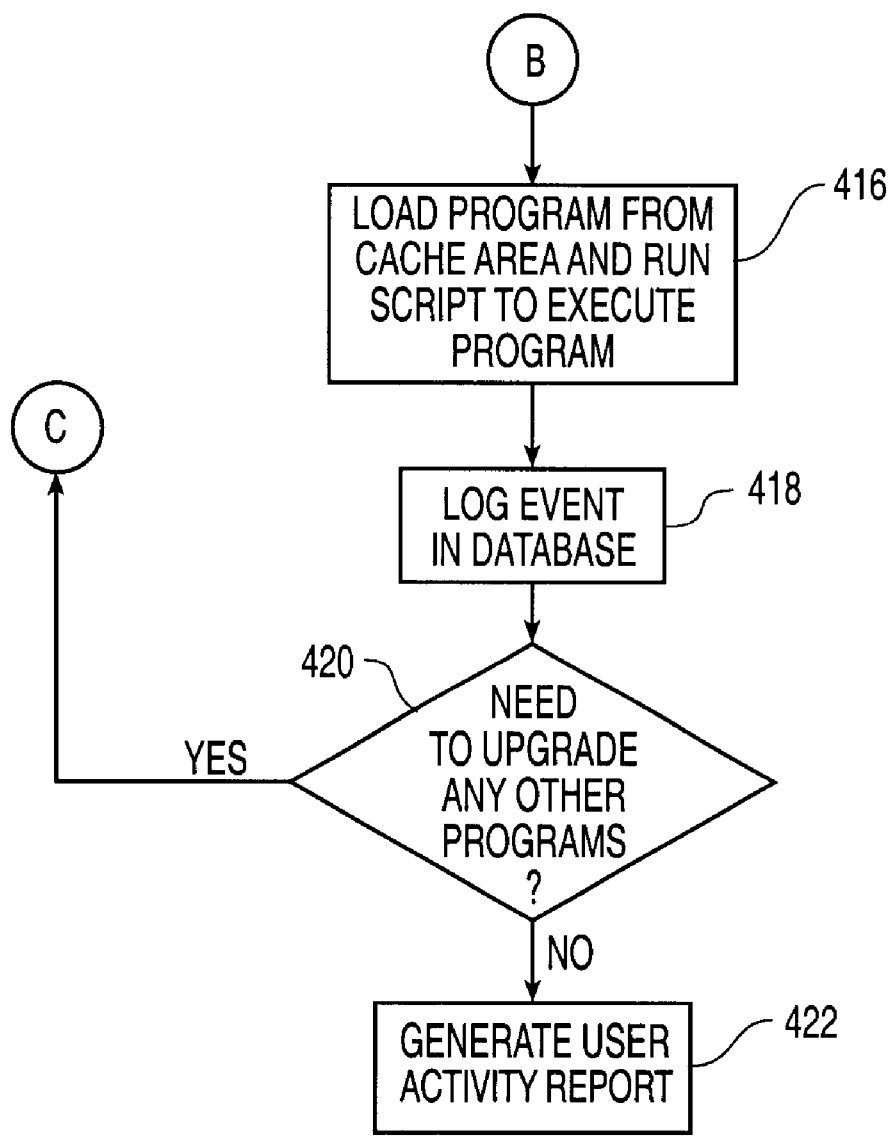

Illustrative operation of the invention is described in conjunction with FIGS. 3–4. A user at a personal computer such as computer 104 accesses the ICSP by typing the URL for the "clinic" web page 300. This causes browser 116 to access the server computer 100, thereby establishing a logical connection with the server computer. The server computer 100 then responds to the user request by sending web page 300, preferably a home page for the ICSP service, to user computer 104 for display. The web page 300 contains fields for an identification number 302, a user's e-mail address 304, and optionally, a web password 306. The user enters the user identification information in the web page 300 and sends the page to the server computer 100 (step 402). The CGI program 140 running on the server computer 100 receives the user identification information and performs a lookup in the user profile database 132 to authenticate the user (step 404). If the user is not authenticated, the CGI program 140 sends an error message to the user computer 104 in the form of a web page (step 420). If, on the other hand, the user is authenticated, the CGI program 140 on the server computer 100 creates a secured connection between the user computer 104 and the server computer 100 (step 406). This process, of authenticating the user computer 104 and creating a secured connection between the two computers 100 and 104, is called "registering" the user computer 104 with the ICSP. The act of registering the user computer 104 at the server computer 100 web site causes the user computer 104 to allow the server computer 100 to run scripts to start applications.

An "event" is an action performed by a user or by the server computer 100. For example, registering a user computer 104 at the ICSP web site is an event. Similarly, the occurrence of a timeout condition, the automatic downloading of an anti-virus program to the user computer 104, or the termination of the secure connection, are events caused by the server computer 100. A "transaction" is defined as a set of events that occur between the registration of the user computer 104 at the ICSP web site and the completion of the actions by the server computer 100 or the termination of the connection established between the two computers. After the user computer 104 is registered at the ICSP, entries are made in the billing database 130 and the user profile database 132 for the event (step 407).

The CGI program running on the server computer 100 causes a web page to be downloaded to the user computer 104. Embedded in the web page are ActiveX™ controls and scripts that cause a search program to be executed on the user computer 104 to determine if any executable software needs execution, installation, upgrades or updates (step 408). In a preferred embodiment, this results in a search of the user computer's storage medium, for example, in the cache area of the browser 116, to determine if any program needs to be downloaded. Additionally, the program looks to determine if there is a need to execute any software program, such as an anti-virus program (step 410). If no execution, installation, upgrades or updates are needed, then the connection between the server computer 100 and the user computer 104 is terminated (step 412).

If, on the other hand, an execution, installation, upgrade or update is determined to be needed, the server computer 100 then proceeds to download new executable software to the user computer 104 via the Internet 102 connection (step 414), or to execute previously downloaded software (step 416). In a preferred embodiment, the server computer 100 downloads an application engine by wrapping it in a COM/ActiveX wrapper and storing the entire package in a browser cache area of the client computer 104.

These application engines are configured to perform different tasks or a combination of different tasks. These tasks include, but are not limited to, checking for any computer viruses on the user computer 104; compressing the software or data located on the storage connected to the user computer 104; searching for software or data on the user computer 104 that needs upgraded versions; upgrading the software or data on the user computer 104; searching for and deleting unused, obsolete, unneeded or undesired software, components or data on the user computer 104; archiving software or data located on the user computer 104; shredding or deleting without trace the data or software located on the user computer; advising or responding to user questions as an expert advisor system; performing hardware and software diagnostics on the user computer 104; and providing a health report card for the user computer 104. It should be noted that a person skilled in the art may download software to accomplish other tasks in a similar manner. Accordingly, the scope of the present invention encompasses that as well.

After the server computer 100 downloads a program to the user computer 104 (according to step 414), the server computer 100 automatically executes the program on the user computer 104 without any intervention by the user (step 416). The details of the execution of the downloaded program are recorded in the database 130 and the user profile database 132 connected to the server computer 100 (step 418).

After the application is executed on the user computer 104, the server computer 100 checks if any other programs need to be downloaded or upgraded on the client computer 104 (step 420). If other programs are to be downloaded or executed, then the server computer 100 performs steps 408–416 without any further intervention by the user.

Upon the expiration of a time period set by the ICSP, or upon demand, a report is generated by the server computer 100 of the transactions logged in the databases 132 and 130 (step 422). This report is either in a textual form summarizing different classes of transactions requested by users of the ICSP, or in a graphical form with two- or three-dimensional bar-graphs, stacked bar graphs, line graphs, or pie charts displaying statistical analyses of different operations performed by or with the server computer 100. Reports of the statistical analysis and graphs representing such analysis are then transmitted in an electronic form to the user computer 104.

Accordingly, using a method in accordance with the preferred embodiments, a relatively unsophisticated computer user who has an Internet browser such as Internet Explorer 4.0 or Netscape Communicator 4.0 installed on their computer system is capable of maintaining a secure, up-to-date, and optimized computer system without needing to manually perform the "sophisticated" steps of purchasing and installing software upgrades, optimization software, antivirus programs, etc. Rather, in a manner analogous to the way a car owner simply takes their car to a service garage and walk away while the car is "automatically" upgraded or repaired, a user in a system according to the preferred embodiments may simply "park" their computer at the ICSP using their Web browser and, after registration or other validation procedure, may simply "walk away" while their computer is automatically upgraded or repaired by encapsulated routines that are automatically downloaded from the ICSP.

The foregoing describes a new and useful method and system for automatically downloading and remotely executing software applications over a secure Internet 102 connection. Those skilled in the art may make numerous modifications and departures from the specific embodiments without departing from the spirit and scope of the claimed invention. For example, the server computer 100 can comprise a distributed computing system or a cluster of networked computers; the database may comprise a distributed database or several databases. Additionally, web pages may comprise an interface that is not specified herein. Other embodiments may include a network connection other than the Internet 102 between the server computer 100 and the user computer 104; and the software downloaded may be intended to perform tasks such as database management, word processing, spread sheet, games, or other tasks that are not specified herein.

What is claimed is:

1. A method for automatically performing one or more maintenance tasks on a remotely located computer connected to a server computer via a data network, said method comprising the steps of:

directing an Internet browser on the remotely located computer to form a logical connection with the server computer;

delivering a software package to the remotely located computer across said logical connection, said software package being encapsulated within a markup language communication unit deliverable across said logical connection, said software package comprising scripts for performing said one or more maintenance tasks on the remotely located computer; and automatically executing the scripts for performing said one or more maintenance tasks on the remotely located computer.

2. The method of claim 1, said step of directing including a registering step, said registering step comprising the steps of:

downloading a web page located on the server computer using the Internet browser;

entering an identifier and a secure password on said web page; and selecting an option presented on the web page to send the identifier and password to the server computer;

wherein said step of delivering the software package is enabled only if a user has provided a valid identifier and password.

3. The method of claim 2, further comprising the steps of:

creating a transaction log on the server computer; and recording information related to said steps of registering and delivering in the said transaction log.

4. The method of claim 3, further comprising the step of generating a periodic activity report for the remotely located computer.

5. The method of claim 4, further comprising the step of transmitting an electronic message in an e-mail format from the server computer to the remotely located computer indicating that a new product or a new application is available for download.

6. The method of claim 5, said logical connection with the server computer being a secure network connection.

7. The method of claim 6, said software package including a program to detect computer viruses on the remotely located computer.

8. The method of claim 2, further comprising the steps of:

before or during registering the remotely located computer, creating an account for a user of the remotely located computer on the server computer; and identifying said identifier and password as valid if the user has a current subscription or a positive fund balance in said user account.

9. The method of claim 8, further comprising the step of transmitting payment information from the remotely located computer to the server computer in an electronic mail message format, wherein said account may reflect a current subscription or an increased fund balance upon receipt of said payment information.

10. The method of claim 9, further comprising the steps of:

generating an electronic receipt on the server computer; and transmitting the receipt to the remotely located computer.

11. The method of claim 1 wherein said one or more maintenance tasks comprise at least one of the following: compression of software, compression of data, search for software that needs to be upgraded, search for data that needs to be upgraded, upgrade of software, upgrade of data, search for obsolete software, search for obsolete data, deletion of obsolete software, deletion of obsolete data, archival of software, archival of data, hardware diagnostics, and software diagnostics.

12. A computer program product for execution by a server computer for enabling the maintenance of a remote user computer coupled to the server computer over a network, comprising:

computer code for receiving a user request from the remote user computer, said user request being entered by the user via a web browser;

computer code for instantiating a download of a maintenance software package to a storage medium connected to the user computer via the web browser; and computer code for causing said maintenance software to automatically execute on the user computer subsequent to downloading;

whereby, responsive only to said user-entered request via said web browser, advanced maintenance routines may be performed on said user computer without requiring local maintenance commands from said user.

13. The computer program product of claim 12, further comprising computer code for receiving payment or subscription information from the user, whereby said maintenance software package is downloaded to the user computer only upon receiving valid payment information or current subscription information from the user.

14. A computer-readable medium, comprising:

means for directing a server computer to encapsulate a self-executing software maintenance program into a markup language communication unit deliverable across the Internet;

means for directing the server computer to receive a user command over the Internet, said user command being received from a user via a web browser installed on a remote user computer;

means for transmitting said encapsulated self-executing software maintenance program to said user remote computer responsive to said user command, whereby said software maintenance program is executed responsive only to commands entered from the user into the web browser.

* * * * *